United States Patent

McElrath et al.

[11] Patent Number: 6,051,653
[45] Date of Patent: Apr. 18, 2000

[54] METAL SALTS OF ACRYLIC OR METHACRYLIC ACID AS CURATIVES FOR COMPOSITIONS CONTAINING HALOGENATED ISOMONOOLEFIN-PARA-AKLYLSTYRENE COPOLYMERS

[75] Inventors: Kenneth Odell McElrath, Houston; Hsien-Chang Wang, Bellaire, both of Tex.

[73] Assignee: Exxon Chemical Patents, Inc., Baytown, Tex.

[21] Appl. No.: 09/187,083

[22] Filed: Nov. 4, 1998

Related U.S. Application Data

[63] Continuation-in-part of application No. 08/934,187, Sep. 19, 1997, abandoned, which is a continuation-in-part of application No. 08/717,033, Sep. 20, 1996, abandoned.

[51] Int. Cl.[7] ........................................................ C08F 8/00
[52] U.S. Cl. .......................... 525/195; 525/193; 525/209; 525/232; 525/274
[58] Field of Search ........................................ 525/274, 195, 525/193, 209, 232

[56] References Cited

U.S. PATENT DOCUMENTS

| | | | |
|---|---|---|---|
| 3,835,201 | 9/1974 | Fischer | 260/897 A |
| 4,192,790 | 3/1980 | McKinstry | 260/31.2 |
| 4,713,409 | 12/1987 | Hayes | 524/518 |
| 4,857,571 | 8/1989 | Reiter et al. | 524/248 |
| 4,987,192 | 1/1991 | Oberster et al. | 525/274 |
| 5,063,268 | 11/1991 | Young | 524/286 |
| 5,162,445 | 11/1992 | Powers et al. | 525/333.4 |
| 5,288,446 | 2/1994 | Noyama | 264/108 |
| 5,298,562 | 3/1994 | Ceska | 525/244 |
| 5,473,017 | 12/1995 | Wang | 525/193 |
| 5,656,694 | 8/1997 | Frechet | 525/195 |

FOREIGN PATENT DOCUMENTS

| | | |
|---|---|---|
| 43 38 424 | 11/1994 | Germany . |
| WO 96/34914 | 11/1996 | WIPO . |

*Primary Examiner*—Fred Zitomer
*Attorney, Agent, or Firm*—Myron B. Kurtzman; Brent M. Peebles; Joseph F. Reidy

[57] ABSTRACT

The invention provides for curable compositions containing a halogenated copolymer of a $C_4$ to $C_7$ isomonoolefin, e.g., isobutylene and a para-alkylstyrene, e.g., para-methylstyrene, and further containing an effective amount of a metal salt, e.g. zinc, of an unsaturated carboxylic acid, e.g. methacrylic acid, as a curing agent. The composition also contains an organic peroxide as a co-curative and one or a mixture of saturated polymer blend components which are co-curable with the halogenated copolymer. The curable composition may further comprise EPDM.

30 Claims, No Drawings

METAL SALTS OF ACRYLIC OR METHACRYLIC ACID AS CURATIVES FOR COMPOSITIONS CONTAINING HALOGENATED ISOMONOOLEFIN-PARA-AKLYLSTYRENE COPOLYMERS

This is a Continuation-in-part of U.S. Ser. No. 08/934,187, filed Sep. 19, 1997, now abandoned, which is in turn a Continuation-in-Part of U.S. Ser. No. 08/717,033 filed Sep. 20, 1996, now abandoned.

BACKGROUND OF THE INVENTION

Field of the Invention

The present invention relates to curing systems for compositions containing halogenated isomonoolefin/para-alkylstyrene copolymer elastomers and blends thereof with other polymers.

Description of Related Art

It is known in the prior art that a combination of a zinc salt of acrylic or methacrylic acid and an organic peroxide may be used to cure rubber compositions containing saturated or unsaturated elastomer compositions and blends thereof.

For example, U.S. Pat. No. 4,713,409 discloses vulcanizable polymer compositions comprising a rubbery polymer such as natural rubber, ethylene/propylene rubber, ethylene/propylene/diene rubber, GR-S, nitrile rubber, neopyryene rubber and blends thereof cured using a combination of at least 25 parts by weight per hundred parts rubber (phr) of a zinc dimethacrylate and a cure effective amount of a peroxide curing agent.

Similarly, U.S. Pat. No. 4,857,571 discloses a free radical curing system for saturated and unsaturated elastomer compositions which is based on a combination of a free radical generating agent such as an organic peroxide and a polyfunctional monomer co-agent which is capable of reacting with the free radical generator to crosslink the elastomer composition. Similar compositions are also disclosed in U.S. Pat. No. 5,288,446.

U.S. Pat. No. 4,987,192 discloses colored tire stocks which are preferably based on a blend of chlorobutyl rubber, natural rubber and EPDM rubbers which are both covalently and ionically crosslinked using a curing system containing conventional sulfur-containing curatives in combination with a zinc dimethacrylate and an organic peroxide.

Crosslinking in these and similar systems generally relies on the creation of free radical sites along the polymer chain and the addition of the difunctional acrylate or methacrylate monomer at these sites to effect crosslinking.

U.S. Pat. No. 5,162,445 discloses halogenated elastomeric random copolymers of an isomonoolefin such as polyisobutylene and a para-alkylstyrene such as para-methylstyrene, referred to herein as BIMS rubber. These copolymers are devoid of ethylenic unsaturation thereby enhancing their resistance to heat, solvents and ozone and may be readily crosslinked by nucleophilic or ionic reactions involving the benzylic halide group present along the polymer chain. Suitable crosslinking agents include a combination of zinc oxide and stearic acid, or zinc stearate alone used at level above about 3.0 parts by weight per hundred parts rubber (phr). Zinc diethyldithiocarbamate is also an effective curative for BIMS rubber. Zinc stearate is also known as an effective curative for elastomer compositions based on a blend of the BIMS rubber and unsaturated diolefin rubbers such as polyisoprene, natural rubber or polybutadiene, as disclosed in copending U.S. application Ser. No. 08/433,773, filed May 3, 1995. The cure level of zinc stearate used in such curable blends ranges from about 0.05 to less than 3 parts by weight phr.

One of the major goals in exploring curing systems for BIMS elastomers is to uncover curatives which will not only effectively cure the BIMS elastomer by itself, but will also cure blends of BIMS elastomers with other chemically diverse saturated polymers such that a relatively balanced cure for each individual elastomeric component of such blends is achieved.

SUMMARY OF THE INVENTION

The invention provides a curable polymeric composition comprising a mixture of a chlorinated or brominated elastomeric, random interpolymer of a $C_4$ to $C_7$ isomonoolefin and a para-alkylstyrene comonomer, at least one other co-curable polymer component which may be a saturated polymer, and a cure effecting amount of curative mixture comprising an organic peroxide and an elastomer-soluble polyvalent metal salt of an unsaturated carboxylic acid containing 3–300 carbon atoms, more preferably an alpha or beta unsaturated monocarboxylic acid containing 3 to 6 carbon atoms.

The polyvalent metal salt curing agents of the present invention provide for fast cure and low reversion cures in halogenated $C_4$–$C_7$ isomonoolefin/para-alkylstyrene elastomer systems and at least a second saturated polymer component when combined with an organic peroxide.

DETAILED DESCRIPTION OF THE INVENTION

The halogenated $Cc_4$–$C_7$ isomonoolefin/par-alkylstyrene (BIMS) used in the present invention are the halogenation product of random copolymers of a $C_4$–$C_7$ isomonoolefin, such as isobutylene, and a para-alkylstyrene comonomer, preferably para-methylstyrene containing at least about 80%, more preferably at least about 90% by weight of the para isomer, and wherein at least some of the alkyl substituent groups present in the styrene monomer units contain halogen. Preferred materials may be characterized as isobutylene interpolymers containing the following monomer units randomly spaced along the polymer chain:

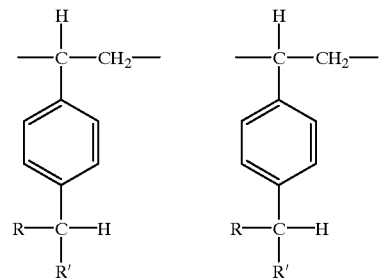

wherein R and R' are independently hydrogen, lower alkyl, preferably $C_1$ to $C_4$ alkyl, and X is bromine or chlorine, and wherein the interpolymer is otherwise substantially free of ring halogen or halogen in the polymer backbone chain. Preferably R and R' are each hydrogen. Up to about 65 mole % of the para-alkylstyrene present in the interpolymer structure may be the halogenated structure (2) above, more preferably from about 5 to 60 mole %.

Most useful of such materials are elastomeric random copolymers of isobutylene and para-methylstyrene containing from about 0.5 to about 20 wt % para-methylstyrene wherein up to about 60 mole % of the methyl substituent groups present on the benzyl ring contain a bromine or chlorine atom, preferably a bromine atom. These copolymers have a substantially homogeneous compositional distribution such that at least 95% by weight of the polymer has a para-alkylstyrene content within 10% of the average para-alkylstyrene content of the polymer. They are also characterized by a narrow molecular weight distribution (Mw/Mn) of less than about 7, more preferably less than about 5.0, a preferred viscosity average molecular weight in the range of from about 300,000 up to about 2,000,000, and a preferred number average molecular weight in the range of from about 10,000, preferably 25,000 to about 1,000,000 as determined by Gel Permeation Chromatography.

The copolymers may be prepared by slurry polymerization of the monomer mixture using a Lewis Acid catalyst, followed by halogenation, preferably bromination, in solution in the presence of halogen and a radical initiator such as heat and/or light and/or a chemical initiator.

Preferred brominated copolymers generally contain from about 0.01 to about 10 mole % of bromomethyl groups, most of which is monobromomethyl, with less than 0.05 mole % dibromomethyl substituents present in the copolymer. These copolymers, their method of preparation, their method of cure and graft or functionalized polymers derived therefrom are more particularly disclosed in U.S. Pat. No. 5,162,445, the complete disclosure of which is incorporated herein by reference.

Suitable metal salts of unsaturated carboxylic acids useful as a curative component for the BIMS elastomer compositions in the present invention are soluble in organic solvent and in the rubber medium and are derived from unsaturated acids containing 3 to 300 carbon atoms, more preferably 3 to 20 carbon atoms. Preferably, the acids are alpha or beta unsaturated monocarboxylic acids containing from 3 to 6 carbon atoms, including carboxylic carbon. Suitable acids include acrylic, methacrylic, oleic, linoleic and crotonic acids, with acrylic and methacrylic acids most preferred. The metal cation may be selected from poly—(di or tri) valent metals such as zinc, iron, cadmium, bismuth, aluminum, magnesium and calcium, with zinc being most preferred.

The level of metal salt curing agent incorporated into the composition is an amount effective to cure or co-cure the polymer composition. This level may generally range from about 0.5 to about 10 wt %, based on the polymer content of the composition, more preferably from about 1 to 7.5 wt %, and most preferably from about 2 to 6 wt %.

Peroxide crosslinking co-curatives which may be employed include organic peroxides such as dicumyl peroxide, benzoyl peroxide, bis-(t-butyl peroxy) diisopropyl benzene, t-butyl, peroxide, t-butyl perbenzoate, 2,5-dimethyl-2,5-di-t-butyl peroxy hexane and like materials. The preferred organic peroxides and dicumyl peroxide and bis-(t-butyl peroxy) diisopropyl benzene.

The peroxide co-curative is also employed in an amount sufficient to co-cure the polymer composition. Generally, such amounts may range from about 0.2 to about 6 wt %, based on the elastomer content of the composition, more preferably from about 1 to 5 wt %.

The unsaturated acid metal salts function as a co-curative when combined with an organic peroxide for the co-curing of blend systems containing the BIMS elastomer and one or more saturated polymers.

Suitable blend polymers include one or a mixture of saturated polymers. By saturated polymer, it is meant to include those polymers which have saturated backbone but may have pendant unsaturation. Illustrative of such polymers are low, medium or high density polyethylene or copolymers of ethylene with up to about 50 wt % of a $C_3$ to $C_8$ monoolefin such as propylene, butene-1, hexene-1 and the like. Preferred ethylene polymers are polyethylene and elastomeric copolymers of ethylene containing up to about 35 wt % of polymerized propylene. Optionally the blend may additionally contain an EPDM such as elastomeric copolymers of ethylene, propylene and a non-conjugated diene such as ethylidene-norbornene. Particularly preferred ethylene copolymers are plastomers polymerized using metallocene polymerization catalyst, such as copolymers of ethylene with from about 5 to 30 wt % of hexene-1 or butene-1, such as available under the EXACT™ tradename from Exxon Chemical Co.

Suitable ethylene polymers useful as blend components generally exhibit a Melt Index in the range of from about 0.5 to 600, more preferably from about 1 to 25.

The second polymer component or mixture of polymer components may be present in the composition at a level of from about 1 to 99 parts by weight per 99 to 1 parts by weight of the BIMS elastomer. Most preferred blends are those containing about 20 to 80% by weight of the BIMS elastomer based on the polymer content of the blend.

Compositions of the invention which further optionally contain the EPDM polymer component may also optionally contain auxiliary curatives such as accelerated sulfur vulcanization systems to modify the cure prosperities. These include sulfur or mixtures of sulfur and sulfur-containing accelerators and/or phenol-formaldehyde resins. Suitable accelerators include benzothiazyl disulfide, N-oxydiethylene benzothiazole-1-sulfenamide, 2-mercatoben-zothiazole, alkyl phenol disulfides, alkyl-thiuram sulfides, m-phenylenebisamlemide, N, $N^1$-diaylguarnidines, dialkyl and diaryl-dithiocarbamates, N-cyclohexyl-2-benzothiazole sulfenamide and like materials.

Suitable dialkyldithiocarbamates include the dialkyldithiocarbamates of zinc, bismuth, cadmium, copper, lead, selenium, and tellurium wherein the alkyl group contains from 1 to 5 carbon atoms, piperidinium pentamethylene-dithiocarbamate and mixtures thereof.

Suitable diarylthiocarbamates include the diaryldithiocarbamates of zinc, bismuth, cadmium, copper, lead, selenium, tellurium, and mixtures thereof.

Suitable alkyl thiuram sulfides include dipentamethylene thiuram tetrasulfide, tetrabutylthiuram disulfide, tetraethylthiuram disulfide, tetramethylthiuram monosulfide, tetrabenzyl thiuram disulfide, and mixtures thereof.

Sulfur and vulcanization accelerators are normally added to the composition at levels in the range of from about 0.5 to about 8% by weight, based on the weight of elastomer present in the composition.

The accelerated sulfur curing system may also be used as a co-curative in curing systems also containing zinc oxide or an equivalent thereof, as an auxiliary curative agent. Zinc oxide is normally used in such systems at a level of from about 0.2 to about 7 parts by weight per 100 parts by weight of elastomer. The present invention provides for particularly good low cure reversion where zinc oxide is present at levels in the range of from about 0.5 to about 5.0 parts by weight per 100 parts by weight of elastomer.

The polymer composition may also contain other additives such a lubricants, fillers, plasticizers, tackifiers, coloring agents, blowing agents, and antioxidants.

Examples of fillers include inorganic filers such as reinforcing grade carbon black, silica, calcium carbonate, talc and clay, and organic fillers such as high-styrene resin, coumarone-indene resin, phenolic resin, lignin, modified melamine resins and petroleum resins.

Examples of lubricants include petroleum-type lubricants such as oils, paraffins, and liquid paraffins, coal tar-type lubricants such as castor oil, linseed oil, rapeseed oil and coconut oil; tall oil; waxes such as beeswax, carnauba wax and lanolin; fatty acids and fatty acid salts such as linoleic acid, palmitic acid, barium stearate, calcuim stearate and zinc laurate; and synthetic polmeric substances such as petroleum resins.

Examples of plasticizers include hydocarbon oils, e.g., paraffin, aromatic and napththenic oils, phthalic acids esters, adipic acid esters, sebacic acid esters and phosphoric acid-type plasticizers.

Examples of tackifiers are petroleum resins, coumarone-indene resins, terpene-phenol resins, and xylene/formaldehyde resins.

Examples of coloring agents are inorganic and organic pigments.

Examples of blowing agent are sodium bicarbonate, ammonium carbonate, $N,N^1$-dinitrosopentamethylenetetramine, azocarbonamide, azobisisobutyronitrile, benzenesulfonyl hydrazide, toluenesulfonyl hydrazide, calcuim amide, p-toluenesulfonyl azide, salicyclic acid, phthalic acid and urea.

The vulcanizable composition may be prepared and blended using any suitable mixing device such as an internal mixer (Brabender Plasticorder), a Banbury Mixer, a mill mixer, a kneader or a similar mixing device. Blending temperatures and times may range from about 35° C. to 180° C. and 4 to 10 minutes respectively. After forming a homogeneous mixture of the elastomer and optional fillers, processing aids, antioxidants and the like, the mixture is then vulcanized by the further mixing-in of the crosslinking agents at a relatively low temperature, followed by heating the resulting blend to a temperature of from about 100° to 200° C. More preferably from about 110°0 to 180° C. for a period of time ranging from about 1 to 60 minutes. Molded articles such as belts, tire components and hoses are prepared by shaping the prevulcanized formulation using an extruders or a mold, and subjecting the composition to temperatures and curing times as set forth above.

The following examples are illustrative of the invention. The materials used in the examples described below were as follows:

BIMS—Random brominated copolymer of isobutylene and para-methylstyrene containing about 7.5 wt % of para-methylstyrene, 1.2 mol % benzyl bromide and having a Mooney Viscosity ML(1+8) at 125° C. of about 45.

EXACT™ 5008—a copolymer of ethylene and butene having a melt index of 10 and a density of 0.865

EXACT™ 3028—a copolymer of ethylene and butene having a melt index of 1.0 and a density of 0.900

SLP-9053—a copolymer of ethylene and butene having a melt index of 4 and a density of 0.865

VISTALON™ 2504 an elastomeric terpolymer of ethylene (57:5 wt %) propylene and ethylidene-norbornene (4.7 wt %) having a Mooney Vicscosity (1+4) 125° C. of 25.

FLEXON™ 815—paraffinic processing oil

SARET™ 634—zinc dimethacrylate available from Sartomer Co. of Westchester, Pa.

DICUP™ 40KE—dicumyl peroxide

SANTOCURE™—N-cyclohexyl-2-benzothiazole sulfenamide

VULTAC™-5—Alkyl phenol disulfide from Pennwalt Corp.

EXAMPLE 1

Rubber masterbatches as disclosed in Table 1 were prepared by blending the BIMS copolymer, carbon black and processing oil (in parts by weight) on a two roll mill at a temperature of about 90° C. and for a period of about 3 minutes. Portions of this masterbatch were then mixed with crosslinking agents as shown in Table 1 by mixing in a two roll mill at 60° C. for about 10 minutes to form samples A, B and C.

Curing behavior of each of these compositions was then evaluated using a Monsanto Oscillating Disc Rheometer under curing and MDR conditions shown in Table I. Physical properties were obtained by molding extruded pellets into molding bars and tests were performed according to the following ASTM procedures:

Tensile Strength—ASTM D-638

Elongation—ASTM D-638

Modulus—ASTM D-790

TABLE I

|  | A | B | C |
|---|---|---|---|
| Master Batch |  |  |  |
| BIMS | 100 | 100 | 100 |
| Carbon Black N-550 | 60 | 60 | 60 |
| Flexon 815 | 10 | 10 | 10 |
| Accelerators |  |  |  |
| SARET 634 | 2 | 2 |  |
| DIGUP 40 KE |  | 2 | 2 |
| Total PHR | 172 | 174 | 172 |
| Curing Conditions |  |  |  |
| Time, min. | 30 | 30 |  |
| Temperature, C. | 171 | 171 |  |
| PHYSICAL PROPERTIES |  |  |  |
| MDR ® 171 C, 1 Arc, 30 min |  |  |  |
| ML, lb-in | 3.74 | 3.52 | 3.01 |
| MH, lb-in | 22.4 | 20.22 | 3.4 |
| ts2, min. | 1.17 | 1.2 | none |
| t90, min | 12.14 | 20.27 | 27.65 |
| Rate, lb-in/min. | 6.9 | 3.2 | 0.3 |
| Stress Strain |  |  |  |
| 100% Modulus, MPa | 5.5 | 5.5 |  |
| 300% Modulus, MPa | none | none |  |
| Tensile at Break, MPa | 14.7 | 13.6 |  |
| Elongation at Break, % | 195 | 192 |  |

The curing data in Table I shows that the zinc dimethacrylate/peroxide curing system effectively cured the BIMS polymer composition. No cure took place using the peroxide as the sole curative (Sample C).

EXAMPLE 2

BIMS (Sample D) and a series of six blends thereof with saturated polymers (Samples E–I) as shown in Table 2 were formulated with both the zinc dimethacrylate and peroxide curing agents and evaluated for curing and physical properties as described in Example 1, except that Sample G was mixed in the two roll mill at 140° C. instead of 60° C.

The data in Table II demonstrates that blends of BIMS and the identified polymers give good initial cure and physical properties and good retention of physical properties after heat aging.

TABLE II

|  | D | E | F | G | H | I |
|---|---|---|---|---|---|---|
| Master Batch |  |  |  |  |  |  |
| BIMS | 100 | 50 | 75 | 50 | 50 | 75 |
| EXACT 5008 |  | 50 | 25 |  |  |  |
| EXACT 3028 |  |  |  | 50 |  |  |
| SLP 9053 |  |  |  |  | 50 | 25 |
| VISTALON 2504 |  |  |  |  |  |  |
| CARBON BLACK N-550 | 60 | 60 | 60 | 60 | 60 | 60 |
| FLEXON 815 | 10 | 10 | 10 | 10 | 10 | 10 |
| Accelerators |  |  |  |  |  |  |
| DICUP 40 KE | 4 | 4 | 2 | 4 | 4 | 2 |
| SARET 634 | 4 | 4 | 2 | 4 | 4 | 2 |
| TOTAL PHR | 178 | 178 | 174 | 178 | 178 | 174 |
| ML. lb-in | 3.70 | 1.67 | 2.18 | 4.87 | 1.97 | 2.67 |
| MH. lb-in | 24.51 | 15.76 | 17.38 | 28.23 | 16.89 | 18.88 |
| Ts2, min. | 1.04 | 1.04 | 1.38 | 0.68 | 0.92 | 1.26 |
| T90, min. | 39.19 | 31.09 | 42.08 | 19.52 | 22.19 | 42.53 |
| Peak Rate, lb-in/min. | 4.00 | 3.40 | 2.50 | 5.80 | 4.10 | 3.00 |
| MH-ML lb-in | 20.81 | 14.10 | 15.20 | 23.37 | 14.92 | 16.20 |
| Curling Conditions |  |  |  |  |  |  |
| Time. min. | 45 | 45 | 45 | 30 | 30 | 45 |
| Temperature, C. | 165 | 165 | 165 | 165 | 165 | 165 |
| PHYSICAL PROPERTIES |  |  |  |  |  |  |
| Initial Properties @ Room Temp |  |  |  |  |  |  |
| 100% Modulus, MPa | 6.6 | 5.0 | 5.8 | 9.5 | 4.2 | 5.0 |
| Psi | 951 | 723 | 846 | 1384 | 608 | 720 |
| Tensile @ Break, MPa | 11.1 | 9.5 | 12.4 | 15.2 | 11.4 | 11.9 |
| Psi | 1608 | 1384 | 1800 | 2206 | 1654 | 1724 |
| % Elongation @ Break | 134 | 267 | 187 | 175 | 377 | 198 |
| Shore A Hardness | 60.9 | 73.7 | 67.3 | 86.7 | 71.9 | 69.1 |
| Age 70 HRS @ 125 C. |  |  |  |  |  |  |
| 100% Modulus, MPa |  | 7.7 |  | 12.8 | 6.3 | 8.6 |
| Psi |  | 1117 |  | 1849 | 916 | 1253 |
| Tensile @ Break, MPa | 11.7 | 10.6 | 8.3 | 16.6 | 13.6 | 13.0 |
| Psi | 1697 | 1538 | 1205 | 2400 | 1976 | 1884 |
| % Elongation @ Break | 96 | 162 | 85 | 135 | 255 | 139 |
| Shore A Hardness | 73.3 | 79.3 | 74.1 | 88.1 | 78.7 | 75.5 |
| Age 70 HRS @ 150 C. |  |  |  |  |  |  |
| 100% Modulus, MPa |  | 8.6 |  | 14.3 | 7.9 | 10.5 |
| Psi |  | 1241 |  | 2072 | 1143 | 1515 |
| Ensile @ Break, MPa | 9.9 | 10.8 | 11.8 | 17.5 | 13.0 | 13.0 |
| Psi | 1431 | 1559 | 1707 | 2536 | 1886 | 1878 |
| % Elongation @ Break | 78 | 131 | 99 | 126 | 186 | 119 |
| Shore A Hardness | 76.3 | 79.5 | 76.7 | 90.1 | 80.5 | 75.5 |

COMPARATIVE EXAMPLE

BIMS (Sample K) and a series of six blends thereof with olefinically unsaturated polymers (Samples L–Q) as shown in Table III were formulated and evaluated for curing and physical properties as described in Example 1. Samples K, L, N and P contain the curatives of the present invention whereas Samples M, O and Q contain a conventional sulfur accelerated zinc oxide curing system.

The data in Table III shows that blends of BIMS and the identified olefinically unsaturated polymers obtain poor heat aging properties.

The crosslinked vulcanized compositions of this invention have an unusual balance of physical prosperities and are useful as coating, adhesives and in molded and extruded mechanical, automotive and industrial goods such as tires, hosing, belting and like applications.

TABLE III

|  | K | L | M | N | O | P | Q |
|---|---|---|---|---|---|---|---|
| Master Batch |  |  |  |  |  |  |  |
| BIMS | 100 | 20 | 20 | 20 | 20 | 30 | 30 |
| NATURAL RUBBER (SMR) |  | 80 | 80 |  |  |  |  |
| BUTADIENE RUBBER (BUDIENE) |  |  |  | 80 | 80 | 70 | 70 |
| CARBON BLACK N-550 | 60 | 60 | 60 | 60 | 60 | 60 | 60 |
| FLEXON 815 | 10 | 10 | 10 | 10 | 10 | 10 | 10 |
| Accelators |  |  |  |  |  |  |  |
| DICUP 40 KE | 4 | 4 |  | 4 |  | 4 |  |
| SARET 634 | 4 | 4 |  | 4 |  | 4 |  |
| ZINC OXIDE |  |  | 2 |  | 2 |  | 2 |
| SANTOCURE |  |  | 2 |  | 2 |  | 2 |
| SULFUR |  |  | 0.5 |  | 0.5 |  | 0.5 |
| VULTAC 5 |  |  | 1.5 |  | 1.5 |  | 1.5 |
| TOTAL PHR | 178 | 178 | 178 | 178 | 178 | 178 | 178 |
| MDR @ 165 C., 1 Arc. 60 min |  |  |  |  |  |  |  |
| ML. lb-in. | 3.7 | 1.6 |  | 4.6 |  | 4.4 |  |
| MH. lb-in. | 24.5 | 22.8 |  | 72.5 |  | 67.9 |  |
| ts2, min. | 1.0 | 0.7 |  | 0.5 |  | 0.6 |  |
| t90, min. | 39.2 | 12.9 |  | 14.3 |  | 16.4 |  |
| Peak Rate, lb-in/min. | 4.0 | 6.8 |  | 22.2 |  | 18.4 |  |
| MH-ML, lb-in. | 20.8 | 21.1 |  | 67.8 |  | 63.5 |  |
| MDR @ 160 C., 1 Arc. 30 min. |  |  |  |  |  |  |  |
| ML, lb-in. |  |  | 2.5 |  | 5.3 |  | 4.9 |
| MH, lb-in. |  |  | 20.5 |  | 35.3 |  | 31.9 |
| ts2, min. |  |  | 2.9 |  | 2.5 |  | 2.4 |
| t90 |  |  | 5.1 |  | 7.4 |  | 8.2 |
| Peak Rate, lb-in/min. |  |  | 11.4 |  | 10.7 |  | 7.5 |

TABLE III-continued

|  | K | L | M | N | O | P | Q |
|---|---|---|---|---|---|---|---|
| MH-ML, lb-in. |  |  | 18.0 |  | 30.0 |  | 27.1 |
| Curing Conditions |  |  |  |  |  |  |  |
| Time. min. | 45 | 20 | 7 | 20 | 9.5 | 20 | 10 |
| Temperature, C. | 165 | 165 | 160 | 165 | 160 | 165 | 160 |
| PHYSICAL PROPERTIES |  |  |  |  |  |  |  |
| Initial Properties @ Room Temp. |  |  |  |  |  |  |  |
| 100% Modulus, MPa | 6.56 | 3.942 | 2792 |  | 3.918 |  | 3.977 |
| Psi | 9511 | 572 | 405 |  | 568 |  | 577 |
| 300% Modulus, MPa |  |  | 14.631 |  |  |  |  |
| Psi |  |  | 2121 |  |  |  |  |
| Tensile @ Break, MPa | 11.1 | 15.3 | 20.2 | 8.8 | 15.7 | 7.5 | 14.3 |
| Psi | 1608 | 2218 | 2935 | 1273 | 2274 | 1081 | 2070 |
| % Elongation @ Break | 134 | 237 | 397 | 78 | 293 | 72 | 278 |
| Shore A Hardness | 60.9 | 59.7 | 57.7 | 78.1 | 67.9 | 77.5 | 65.5 |
| Age 70 HRS @ 125 C. |  |  |  |  |  |  |  |
| 100% Modulus MPa |  | 1.91 |  |  |  |  |  |
| Psi |  | 277 |  |  |  |  |  |
| Tensile @ Break, MPa | 11.7 | 3.2 | 1.9 | 2.4 | 4.3 | 3.5 | 7.0 |
| Psi | 1697 | 463 | 271 | 342 | 626 | 528 | 1018 |
| % Elongation 2 Break | 96 | 152 | 90 | 16 | 50 | 33 | 81 |
| Shore A Hardness | 73.3 | 46.9 | 45.3 | 82.5 | 75.5 | 81.9 | 74.5 |
| Aged 70 HRS @ 150 C. |  |  |  |  |  |  |  |
| Tensile @ Break, MPa | 9.9 | Failed | Failed | Failed | Failed | Failed | Failed |
| Psi | 1431 |  |  |  |  |  |  |
| % Elongation @ Break | 78 |  |  |  |  |  |  |
| Shore A Hardness | 76.3 | 59.7 | 61.9 | 91.9 | 89.9 | 92.3 | 90.3 |

We claim:

1. A curable polymeric composition consisting essentially of a mixture of a chlorinated or brominated elastomeric, random interpolymer of a $C_4$ to $C_7$ isomonoolefin and a para-alkylstyrene comonomer, a saturated polymer, and a cure effecting amount of curative mixture comprising an elastomer-soluble polyvalent metal salt of an unsaturated carboxylic acid containing 3 to 300 carbon atoms and an organic peroxide.

2. The composition of claim 1 wherein said carboxylic acid is an alpha or beta unsaturated monocarboxylic acid containing 3 to 6 carbon atoms.

3. The composition of claim 2 wherein said monocarboxylic acid is selected from the group consisting of acrylic, methacrylic and crotonic acids.

4. The composition of claim 3 wherein said monocarboxylic acid is methacrylic acid.

5. The composition of claim 2 wherein said polyvalent metal is selected from the group consisting of zinc, iron, cadmium, bismuth, aluminum, magnesium and calcium.

6. The composition of claim 5 wherein said polyvalent metal is zinc.

7. The composition of claim 2 wherein said curative is zinc diacrylate or zinc dimethacrylate.

8. The composition of claim 1 wherein said interpolymer is a brominated interpolymer containing at least about 80 wt % of isobutylene and from about 0.5 up to about 20 wt % of para-methylstyrene.

9. The composition of claim 8 wherein from about 5 to about 60 mol % of the para-methylstyrene monomer units contain a mono-bromomethyl group.

10. The composition of claim 8 wherein said interpolymer has a content of bromomethyl groups in the range of from about 0.01 to about 10 mol %.

11. The composition of claim 1 wherein said polyvalent metal salt is present in said composition at a level of from about 0.5 to about 10 wt %, based on the weight of polymer present in said composition.

12. The composition of claim 1 wherein said saturated polymers is present in said composition at a level of 1 to 99 parts by weight per 99 to 1 part by weight of said halogenated interpolymer.

13. The composition of claim 12 further comprising an EPDM rubber.

14. The composition of claim 12 wherein said saturated polymers is selected from the group consisting of polyethylene and copolymers of ethylene with up to about 50 wt % of a $C_3$ to $C_8$ monoolefin.

15. The composition of claim 1 wherein said organic peroxide is present in said composition at a level of from about 0.2 to about 6 wt. %, based on the polymer content of said composition.

16. The composition of claim 12 wherein said carboxylic acid is an alpha or beta unsaturated monocarboxylic acid containing 3 to 6 carbon atoms.

17. The composition of claim 16 wherein said monocarboxylic acid is selected from the group consisting of acrylic, methacrylic and crotonic acids.

18. The composition of claim 17 wherein said monocarboxylic acid is methacrylic acid.

19. The composition of claim 16 wherein the polyvalent metal is selected from the group consisting of zinc, iron, cadmium, bismuth, aluminum, magnesium and calcium.

20. The composition of claim 19 wherein the polyvalent metal is zinc.

21. The composition of claim 12 wherein the curative is zinc diacrylate or zinc dimethacrylate.

22. The composition of claim 12 wherein the interpolymer is a brominated interpolymer containing at least about 80 wt % of isobutylene and from about 0.5 up to about 20 wt % of para-methylstyrene.

23. The composition of claim 22 wherein from about 5 to about 60 mol % of the para-methylstyrene monomer units contain a mono-bromomethyl group.

24. The composition of claim 22 wherein the interpolymer has a content of bromomethyl groups in the range of from about 0.001 to about 10 mol %.

25. The composition of claim 12 wherein the polyvalent metal salt is present in said composition at a level of from about 0.5 to about 10 wt % based on the weight of polymer present in said composition.

26. The composition of claim 12 wherein the organic peroxide is present in said composition at a level of from about 0.2 to about 6 wt % based on the polymer content of said composition.

27. A method of preparing a vulcanized composition comprising heating the composition of claim 1 at a temperature and for a period of time sufficient to cure said composition.

28. A method for preparing a vulcanized composition comprising heating the composition of claim 12 at a temperature and for a period of time sufficient to cure said composition.

29. A vulcanizate prepared by the method of claim 28.

30. A vulcanizate prepared by the method of claim 29.

* * * * *